US010187161B2

(12) United States Patent
Ito

(10) Patent No.: US 10,187,161 B2
(45) Date of Patent: Jan. 22, 2019

(54) FADING MITIGATION OF TURBULENT CHANNEL BASED ON POLARIZATION DIVERSITY IN COHERENT OPTICAL RECEIVERS

(71) Applicant: X Development LLC, Mountain View, CA (US)

(72) Inventor: Christopher Joshua Shiro Ito, Mountain View, CA (US)

(73) Assignee: X Development LLC, Mountain View, CA (US)

(*) Notice: Subject to any disclaimer, the term of this patent is extended or adjusted under 35 U.S.C. 154(b) by 0 days.

(21) Appl. No.: 15/689,616

(22) Filed: Aug. 29, 2017

(65) Prior Publication Data
US 2018/0062758 A1 Mar. 1, 2018

Related U.S. Application Data

(63) Continuation of application No. 15/071,731, filed on Mar. 16, 2016, now Pat. No. 9,787,407.

(51) Int. Cl.
| | |
|---|---|
| *H04Q 11/00* | (2006.01) |
| *H04J 14/00* | (2006.01) |
| *H04B 10/564* | (2013.01) |
| *H04B 10/532* | (2013.01) |
| *H04B 10/61* | (2013.01) |
| *H04J 14/06* | (2006.01) |
| *H04B 10/572* | (2013.01) |
| *H04B 10/11* | (2013.01) |

(52) U.S. Cl.
CPC ........... *H04B 10/614* (2013.01); *H04B 10/11* (2013.01); *H04B 10/572* (2013.01); *H04J 14/06* (2013.01)

(58) Field of Classification Search
CPC ...... H04B 10/614; H04B 10/572; H04J 14/06
USPC ........................................ 398/205, 118–131
See application file for complete search history.

(56) References Cited

U.S. PATENT DOCUMENTS

| | | | |
|---|---|---|---|
| 5,436,838 | A | 7/1995 | Miyamori |
| 5,822,429 | A | 10/1998 | Casabona et al. |
| 6,233,079 | B1 | 5/2001 | Miyamori |
| 6,512,480 | B1 | 1/2003 | Reudink |
| 6,714,742 | B1 | 3/2004 | Hayee et al. |

(Continued)

OTHER PUBLICATIONS

International Search Report and Written Opinion for PCT Aplication No. PCT/US2017/013646 dated Apr. 5, 2017.

*Primary Examiner* — Oommen Jacob
(74) *Attorney, Agent, or Firm* — Lerner, David, Littenberg, Krumholz & Mentlik, LLP

(57) ABSTRACT

A method includes receiving a first data packet on a first polarization portion of an optical signal from a second communication terminal through a free space optical link during a first time period and receiving a first data packet replica on the first polarization portion of the optical signal during a second time period. The second time period is delayed in time relative to the first time period. The method also includes determining receiving powers for the optical link during both the first time period and the second time period based on at least one of the received first data packet and the received first data packet replica. The method also includes selecting the one of the first data packet or the first data packet replica that is associated with the highest receiving power for the optical link as surviving data for maintaining the optical link.

18 Claims, 8 Drawing Sheets

(56) References Cited

U.S. PATENT DOCUMENTS

| | | | |
|---|---|---|---|
| 6,845,243 B1 | 1/2005 | Gaddy et al. | |
| 7,106,971 B1 * | 9/2006 | Davis | H04B 10/112 |
| | | | 398/121 |
| 7,460,839 B2 | 12/2008 | Leabman | |
| 7,580,672 B2 | 8/2009 | Rowitch | |
| 8,737,190 B2 | 5/2014 | Yong et al. | |
| 8,948,239 B1 | 2/2015 | Martin et al. | |
| 9,083,471 B2 | 7/2015 | Tselniker et al. | |
| 9,356,679 B2 | 5/2016 | Mujtaba et al. | |
| 2005/0005225 A1 | 1/2005 | Johnson et al. | |
| 2006/0117360 A1 * | 6/2006 | Cooper | H04N 7/17318 |
| | | | 725/100 |
| 2006/0262721 A1 | 11/2006 | Radunovic et al. | |
| 2007/0135050 A1 | 6/2007 | Schiff | |
| 2008/0171553 A1 | 7/2008 | Ren et al. | |
| 2011/0150114 A1 | 6/2011 | Miao et al. | |
| 2011/0183698 A1 | 7/2011 | Hoctor et al. | |
| 2011/0262145 A1 * | 10/2011 | Ruggiero | G02B 17/0856 |
| | | | 398/115 |
| 2012/0064825 A1 | 3/2012 | Landon et al. | |
| 2012/0129464 A1 | 5/2012 | Yamada | |
| 2013/0071104 A1 | 3/2013 | Nakashima et al. | |
| 2013/0100456 A1 | 4/2013 | Yu et al. | |
| 2013/0195450 A1 | 8/2013 | Ashwood-Smith | |
| 2014/0099116 A1 | 4/2014 | Bai et al. | |
| 2014/0342770 A1 | 11/2014 | Yang et al. | |
| 2015/0256265 A1 * | 9/2015 | Chen | H04B 10/58 |
| | | | 398/197 |
| 2015/0381282 A1 | 12/2015 | Zhang et al. | |

\* cited by examiner

FADING MITIGATION OF TURBULENT CHANNEL BASED ON POLARIZATION DIVERSITY IN COHERENT OPTICAL RECEIVERS

CROSS REFERENCE TO RELATED APPLICATIONS

This U.S. patent application is a continuation of, and claims priority under 35 U.S.C. § 120 from, U.S. patent application Ser. No. 15/071,731, filed on Mar. 16, 2016, which is hereby incorporated by reference in its entirety.

TECHNICAL FIELD

This disclosure relates to using polarization diversity in coherent optical receivers to mitigate fading of a turbulent channel.

BACKGROUND

Communication terminals, such as aerial communication devices that operate at high altitudes, may transmit and receive optical signals through free space optical links. Free-space optical communication systems are an attractive solution for meeting increasing bandwidth demands. Density of the air, wind speeds, air pressure, and turbulence may cause air scintillation across optical links to fluctuate. Air scintillation may result in optical power fades over optical signals communicated between the communication terminals. There is no correctable action when optical power fades become too deep, thereby rendering optical communication links between communication terminals unavailable.

Fading mitigation techniques are employed by free-space optical communication systems in order to keep the optical link available when optical power fades are present. For example, spatial and time/wavelength diversity schemes send replicas of data to increase the probability that one of the replicas of the data will propagate through a less turbulent medium that avoids the optical power fade. In spatial diversity, two wavelengths carrying the same data are transmitted from two different physical locations. However, spatial diversity requires redundant physical hardware for the two locations, adding additional space, weight, and power requirements. In time/wavelength diversity, two wavelengths carrying the same data are transmitted from the same physical location, but delayed in time. While only one physical location is required for time/wavelength diversity, the use of an additional optical channel requires twice as much transmit optical power to achieve the same capacity as a single optical channel.

SUMMARY

One aspect of the disclosure provides a method for fading mitigation of a turbulent channel. The method includes receiving, at a first communication terminal, a first data packet on a first polarization portion of an optical signal from a second communication terminal through a free space optical link during a first time period and receiving, at the first communication terminal, a replica of the first data packet on a second polarization portion of the optical signal during a second time period. The second time period is delayed in time relative to the first time period. The method also includes determining, by control hardware of the first communication terminal, receiving powers for the optical link during both the first time period and the second time period based on at least one of the received first data packet and the received first data packet replica and selecting, by the control hardware, the one of the first data packet or the first data packet replica that is associated with the highest receiving power for the optical link as surviving data for maintaining the optical link.

Implementations of the disclosure may include one or more of the following optional features. In some implementations, the first polarization portion and the second polarization portion are orthogonal to one another. The second communication terminal may transmit the optical signal in a single optical wavelength. The second communication terminal may encode the first polarization portion and the second polarization portion onto a polarization multiplexed optical carrier including the optical signal for transmission to the first communication terminal through the optical link. In some examples, the second communication terminal applies a time delay between the second polarization portion and the first polarization portion to delay the second polarization in time relative to the first polarization. The second communication terminal may further dynamically adjust the time delay between the second polarization portion and the first polarization portion based on at least one of weather conditions, altitude, or directionally of the optical link.

In some examples, determining the receiving powers includes, when the first data packet is received on the first polarization portion: encoding, by the control hardware, the first data packet to determine an error rate of the first packet; and determining the receiving power for the optical link during the first time period based on the error rate of the first data packet. When the first data packet replica is received on the second polarization portion, the method may include encoding, by the control hardware, the first data packet replica to determine an error rate of the first data packet replica and determining the receiving power for the optical link during the second time period based on the error rate of the first data packet replica.

Selecting the one of the first data packet or the first data packet replica may include, when the receiving power for the optical link during the first time period is greater than the receiving power for the optical link during the second time period, selecting the first data packet received on the first polarization portion as the surviving data for maintaining the optical link, and dropping the first data packet replica received on the second polarization portion. When the receiving power for the optical link during the second time period is greater than the receiving power for the optical link during the first time period, the method may include selecting the first data packet replica received on the second polarization portion as the surviving data for maintaining the optical link, and dropping the first data packet received on the first polarization portion.

When receiving the first data packet replica on the second polarization portion, the method may include receiving, at the first communication terminal, a second data packet on the first polarization portion of the optical signal during the second time period, and determining by the control hardware, the receiving power for the optical link during the second time period based on at least one of the first data packet replica received on the second polarization portion or the second data packet received on the first polarization portion. The method may also include receiving, at the first communication terminal, a replica of the second data packet on the second polarization portion during a third time period and determining, by the control hardware, the receiving power for the optical link during the third time period based on the second data packet replica received on the second polarization portion. The third time period may be delayed in time relative to the second time period.

In some examples, when the receiving power for the optical link during the second time period is greater than the receiving powers for the optical link during the first time period and the third time period, the method includes selecting, by the control hardware, the first data packet replica received by the second polarization portion over the first data packet received on the first polarization portion as the surviving data for maintaining the optical link. The method may also include selecting, by the control hardware, the second data packet received on the first polarization portion over the second data packet replica received on the second polarization portion as surviving data for maintaining the optical link.

When the receiving power for the optical link during the first time period and the third time period are greater than the receiving power for the optical link during the second time period, the method may include selecting, by the control hardware, the first data packet received the first polarization portion over the first data packet replica received on the second polarization portion as the surviving data for maintaining the optical link. The method may also include selecting, by the control hardware, the second data replica received on the second polarization portion over the second data packet received on the first polarization portion as surviving data for maintaining the optical link.

When receiving the second data packet replica on the second polarization portion, the method may include receiving, at the first communication terminal, a third data packet on the first polarization portion of the optical link during the third time period and determining, by the control hardware, the receiving power for the optical link during the third time period based on the second data packet replica received on the second polarization portion and the third data packet received on the first polarization portion. The method may also include receiving, at the first communication terminal, a replica of the third data packet on the second polarization portion and a fourth data packet on the first polarization portion of the optical link during a fourth time period. The fourth time period may be delayed in time relative to the third time period. The method may further include determining, by the control hardware, the receiving power for the optical link during the fourth time period based on at least one of the third data packet replica received on the second polarization portion and the fourth data packet received on the first polarization portion.

In some examples, when the receiving powers for the optical link during the second time period and the fourth time period are greater than the receiving powers for the optical link during the first time period and the third time period, the method includes selecting, by the control hardware, the first data packet replica received on the second polarization portion over the first data packet received on the first polarization portion as the surviving data for maintaining the optical link. The method may also include selecting, by the control hardware, the second data packet received on the first polarization portion over the second packet replica received on the second polarization portion as surviving data for maintaining the optical link. The method may further include selecting, by the control hardware, the third data packet replica received on the second polarization portion over the third data packet received on the first polarization portion as surviving data for maintaining the optical link.

In some implementations, when the receiving powers for the optical link during the first time period and the third time periods are greater than the receiving powers for the optical link during the second time period and the fourth time period, the method includes selecting, by the control hardware, the first data packet received on the first polarization portion over the first data packet replica received on the second polarization portion as the surviving data for maintaining the optical link. The method may also include selecting, by the control hardware, the second data packet replica received on the second polarization portion over the second data packet received on the first polarization portion as surviving data for maintaining the optical link and selecting, by the control hardware, the third data packet received on the first polarization portion over the third data packet replica received on the second polarization portion as surviving data for maintaining the optical link. The first communication terminal or the second communication terminal may include a high-altitude platform.

Another aspect of the disclosure provides a communication terminal including a coherent optical receiver, control hardware in communication with the coherent optical receiver and memory hardware in communication with the control hardware. The receiver is configured to receive a first data packet on a first polarization portion of an optical signal from a second communication terminal through a free space optical link during a first time period and receive a replica of the first data packet on a second polarization portion of the optical signal during a second time period, the second time period delayed in time relative to the first time period. The memory hardware stores instructions that when executed on the control hardware cause the control hardware to perform operations. The operations include determining receiving powers for the optical link during both the first time period and the second time period based on at least one of the received first data packet and the received first data packet replica and selecting the one of the first data packet or the first data packet replica that is associated with the highest receiving power for the optical link as surviving data for maintaining the optical link.

This aspect may include one or more of the following optional features. In some implementations, the first polarization portion and the second polarization are orthogonal to one another. The second communication terminal may transmit the optical signal in a single optical wavelength. The second communication terminal may encode the first polarization portion and the second polarization portion onto a polarization multiplexed optical carrier including the optical signal for transmission to the first communication terminal through the optical link. The second communication terminal may also apply a time delay between the second polarization portion and the first polarization portion to delay the second polarization in time relative to the first polarization. The second communication terminal may further include dynamically adjust the time delay between the second polarization portion and the first polarization portion based on at least one of weather conditions, altitude, or directionality of the optical link.

In some examples, determining the receiving powers includes, when the first data packet is received on the first polarization portion, encoding the first data packet to determine an error rate of the first data packet and determining the receiving power for the optical link during the first time period based on the error rate of the first data packet. When the first data packet replica is received on the second polarization portion, the communication terminal may include encoding the first data packet replica to determine an error rate of the first data packet replica and determining the receiving power for the optical link during the first time period based on the error rate of the first data packet.

Selecting the one of the first data packet or the first data packet replica may include when the receiving power for the optical link during the first time period is greater than the receiving power for the optical link during the second time period, selecting the first data packet received on the first polarization portion as the surviving data for maintaining the optical link and dropping the first data packet replica received on the second polarization portion. When the receiving power for the optical link during the second time period is greater than the receiving power for the optical link during the first time period, the first communication terminal may include selecting the first data packet replica received on the second polarization portion as the surviving data for maintaining the optical link and dropping the first data packet received on the first polarization portion.

In some implementations, the coherent optical receiver is further configured to receive a second data packet on the first polarization portion of the optical signal during the second time period and receive a replica of the second data packet on the second polarization portion during a third time period, the third time period delayed in time relative to the second time period. The operations may also include determining the receiving power for the optical link during the second time period based on at least one of the first data packet replica received on the second polarization portion or the second data packet received on the first polarization portion and determining the receiving power for the optical link during the third time period based the second data packet replica received on the second polarization portion.

When the receiving power for the optical link during the second time period is greater than the receiving powers for the optical link during the first time period and the third time period, the operations include selecting the first data packet replica received the second polarization portion over the first data packet received on the first polarization portion as the surviving data for maintaining the optical link and selecting the second data packet received on the first polarization portion over the second data packet replica received on the second polarization portion as surviving data for maintaining the optical link. In some examples, the operations include, when the receiving power for the optical link during the first time period and the third time period are greater than the receiving power for the optical link during the second time period, selecting the first data packet received the first polarization portion over the first data packet replica received on the second polarization portion as the surviving data for maintaining the optical link, and selecting the second data packet replica received on the second polarization portion over the second data packet received on the first polarization portion as surviving data for maintaining the optical link.

In some examples, the coherent optical receiver is configured to receive a third data packet on the first polarization portion of the optical link during the third time period and receive a replica of the third data packet on the second polarization portion and a fourth data packet on the first polarization portion of the optical link during a fourth time period, the fourth time period delayed in time relative to the third time period. The operations may further include determining the receiving power for the optical link during the third time period based on the second data packet replica received on the second polarization portion and the third data packet received on the first polarization portion and determining the receiving power for the optical link during the fourth time period based on at least one of the third data packet replica received on the second polarization portion and the fourth data packet received on the first polarization portion.

When the receiving powers for the optical link during the second time period and the fourth time period are greater than the receiving powers for the optical link during the first time period and the third time period, selecting the first data packet replica received on the second polarization portion over the first data packet received on the first polarization portion as the surviving data for maintaining the optical link. The operations may further include selecting the second data packet received on the first polarization portion over the second data packet replica received on the second polarization portion as surviving data for maintaining the optical link, and selecting the third data packet replica received on the second polarization portion over the third data packet received on the first polarization portion as surviving data for maintaining the optical link.

In some implementations, the operations include, when the receiving powers for the optical link during the first time period and the third time periods are greater than the receiving powers for the optical link during the second time period and the fourth time period, selecting the first data packet received on the first polarization portion over the first data packet replica received on the second polarization portion as the surviving data for maintaining the optical link. The operations may also include selecting the second data packet replica received on the second polarization portion over the second data packet received on the first polarization portion as surviving data for maintaining the optical link, and selecting the third data packet received on the first polarization portion over the third data packet replica received on the second polarization portion as surviving data for maintaining the optical link. The first communication terminal or the second communication terminal may include a high-altitude platform.

The details of one or more implementations of the disclosure are set forth in the accompanying drawings and the description below. Other aspects, features, and advantages will be apparent from the description and drawings, and from the claims.

DETAILED DESCRIPTION

Figure 1:
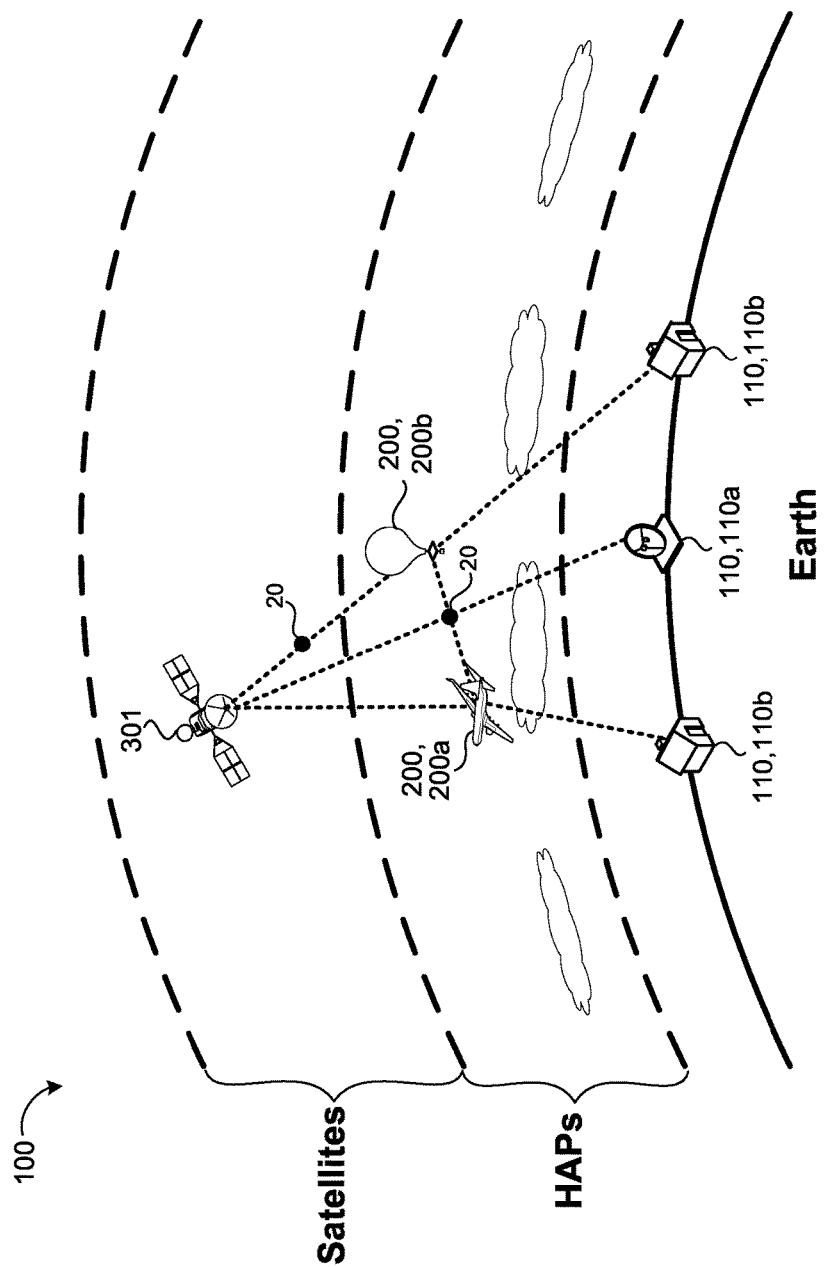
FIG. 1 is a schematic view of an example communication system.

Referring to FIG. 1, in some implementations, a global-scale communication system 100 includes gateways 110 (e.g., source ground stations 110a and destination ground stations 110b), high altitude platforms (HAPs) 200, and satellites 301. The source ground stations 110a communicate with the satellites 301, the satellites 301 communicate with the HAPs 200, and the HAPs 200 communicate with one another and with the destination ground stations 110b. In some examples, the source ground stations 110a also operate as linking-gateways between the satellites 300. The source ground stations 110a may be connected to one or more service providers and the destination ground stations 110b may be user terminals (e.g., mobile devices, residential WiFi devices, home networks, etc.). In some implementations, the HAPs 200 include aerial communication devices that operate at high altitudes (e.g., 17-22 km). Each HAP 200 may be released into the earth's atmosphere, e.g., by an air craft, or flown to the desired altitude. Moreover, the HAP 200 may operate as a quasi-stationary aircraft. In some examples, the HAP 200 is an aircraft 200a, such as an unmanned aerial vehicle (UAV); while in other examples, the HAP 200 is a communication balloon 200b. The HAP 200 may receive a communication 20 from one of the satellites 301 and reroute the communication 20 to another HAP 200 or one of the destination ground stations 110b. The satellite 301 may be in Low Earth Orbit (LEO), Medium Earth Orbit (MEO), or High Earth Orbit (HEO), including Geosynchronous Earth Orbit (GEO).

Figure 2B:
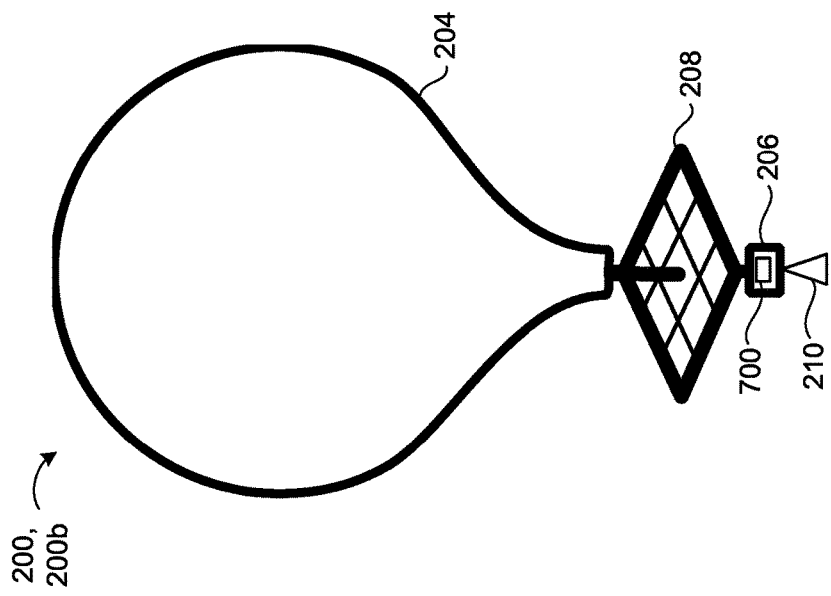
FIGS. 2A and 2B are perspective views of example high-altitude platforms.
Figure 2A:
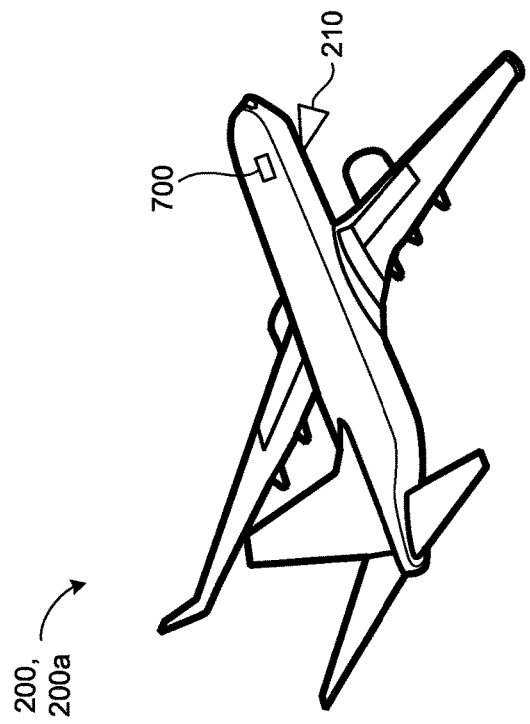

Referring to FIGS. 2A and 2B, in some implementations, the HAP 200 includes a transceiver 210 that receives the communication 20 from the satellite 301 or another HAP 200 and transmits the communication 20 to the destination ground station 110b or another HAP 200. The HAP 200 may include control hardware 700 that processes the received communication 20 and determines a path of the communication 20 to arrive at the destination ground station 110b or the other HAP 200. In some implementations, one or more of the HAPs 200 are capable of communicating with one another by transmitting optical signals 320 (FIG. 3) through a free space optical link 322 (FIG. 3).

FIG. 2B illustrates an example communication balloon 200b that includes a balloon 204 (e.g., sized about 49 feet in width and 39 feet in height and filled with helium or hydrogen), an equipment box 206, and solar panels 208. The equipment box 206 includes control hardware 700 that executes algorithms to determine a target location for the high-altitude balloon 200b, thereby allowing each high-altitude balloon 200b to move into a layer of wind blowing in a direction to take the balloon 200b to the target location. The equipment box 206 also includes batteries to store power and the transceiver 210 to communicate with other devices (e.g., other HAPs 200, satellites 301, gateways 110, such as user terminals 110b, internet antennas on the ground, etc.). The solar panels 208 may power the equipment box 206.

Communication balloons 200b are typically released in to the earth's stratosphere to attain an altitude between 11 to 23 miles and provide connectivity for a ground area of 25 miles in diameter at speeds comparable to terrestrial wireless data services (such as, 3G or 4G). The communication balloons 200b float in the stratosphere at an altitude twice as high as airplanes and the weather (e.g., 20 km above the earth's surface). The high-altitude balloons 200b are carried around the earth by winds and can be steered by rising or descending to an altitude with winds moving in the desired direction. Winds in the stratosphere are usually steady and move slowly from about 5 mph to about 20 mph, and each layer of wind varies in direction and magnitude.

Figure 3:
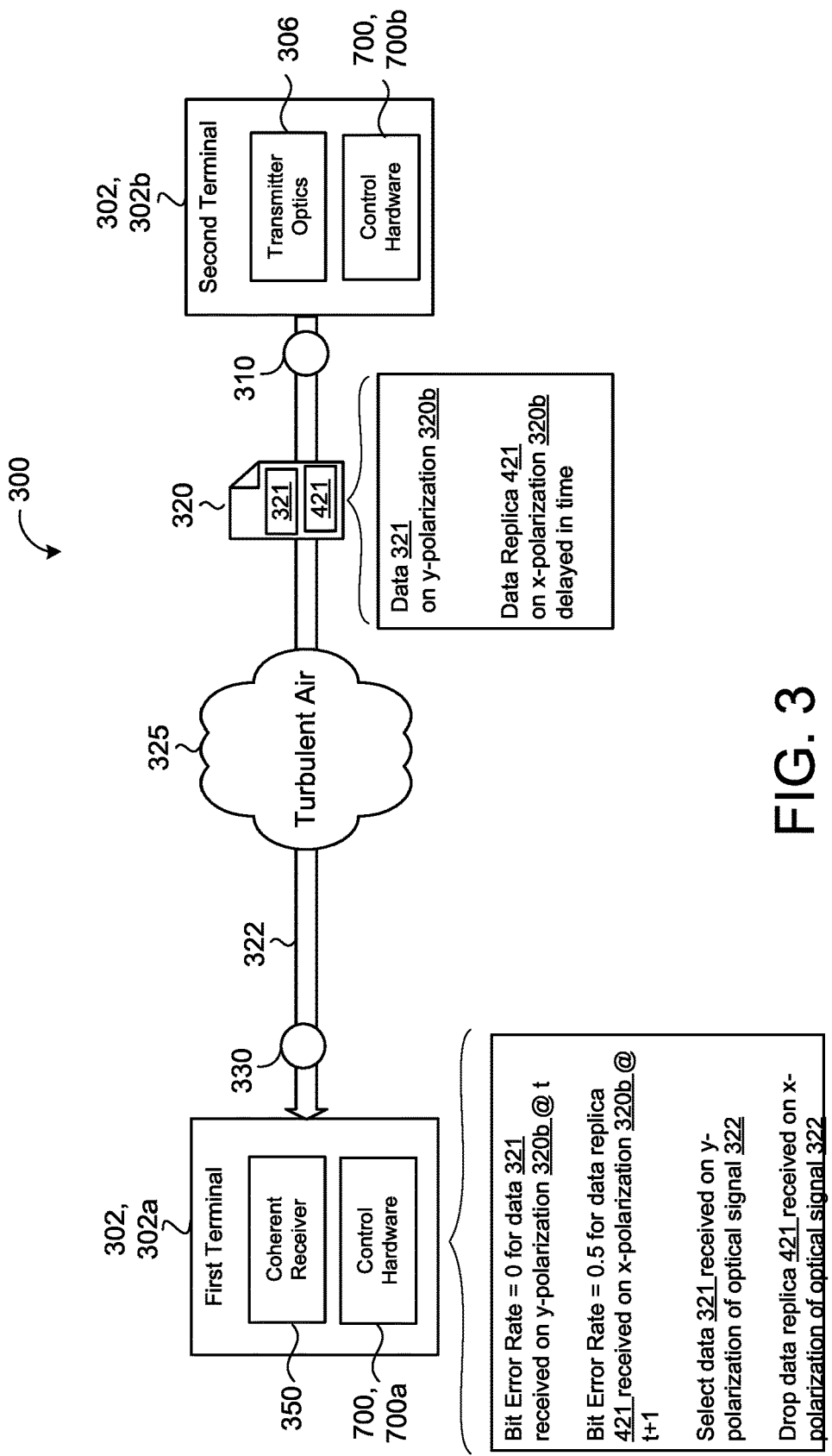
FIG. 3 is a schematic view of an example communication system that mitigates power fading over a free-space optical link between two communication terminals.

Referring to FIG. 3, in some implementations, a communication system 300 includes a first communication terminal 302, 302a (hereinafter 'first terminal 302') receiving an optical signal 320 from a second communication terminal 302, 302b (hereinafter 'second terminal 302b') through a free space optical link 322. The optical signal 320 may include data 321, such as internet packets, being routed through the global-scale communication system 100. In some implementations, the terminals 302 include HAPs 200 operating at high altitudes (e.g., 17-22 km) within the Earth's atmosphere, thereby requiring the optical signal 320 to pass through turbulent air 325. In other implementations, at least one of the terminals 302 includes a satellite 301 or a gateway 110.

Figure 4A:
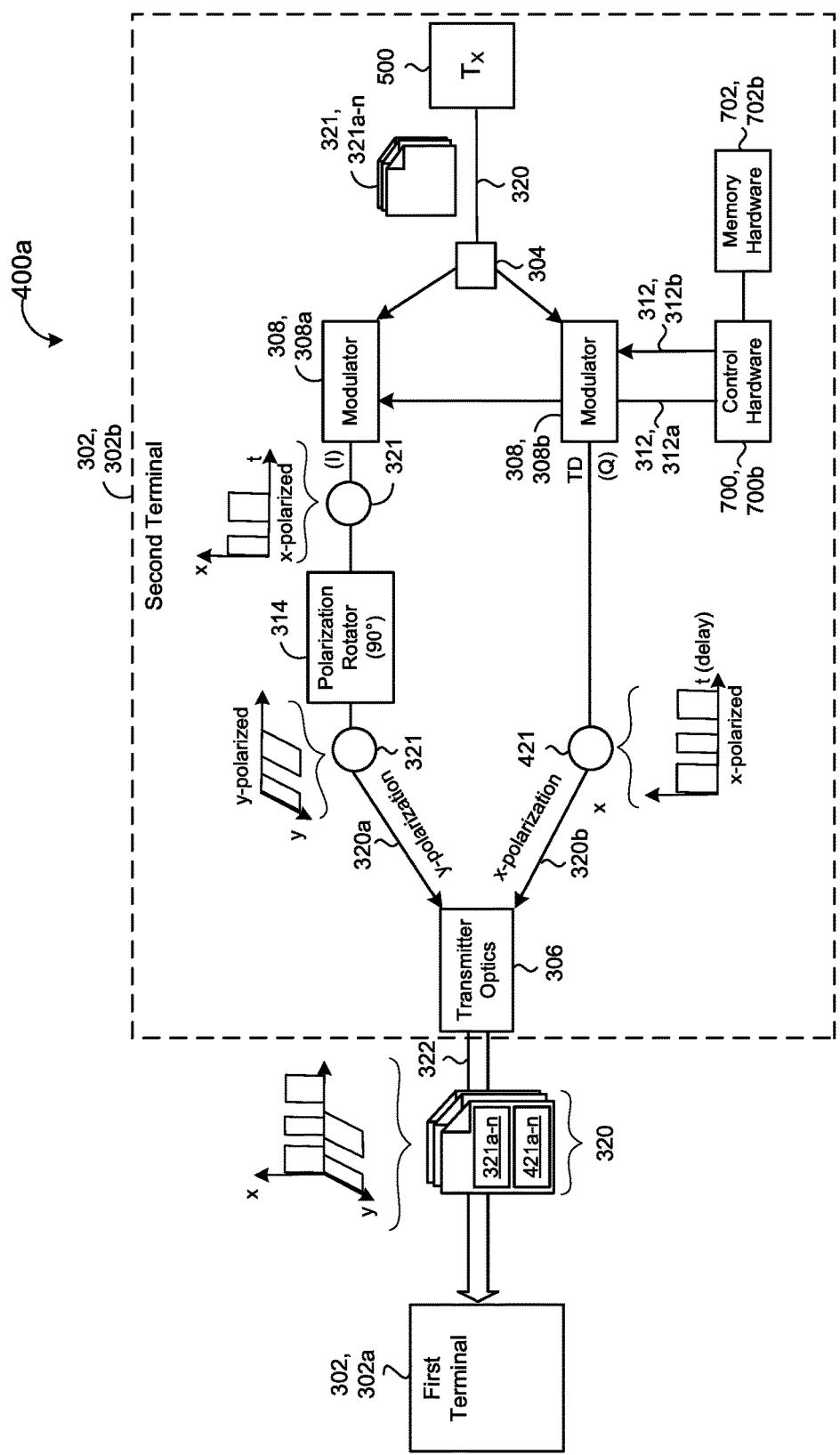
FIG. 4A is a schematic view of an example communication terminal including transmitter optics configured to transmit two replicas of data on two polarization portions of a single optical single.
Figure 4B:
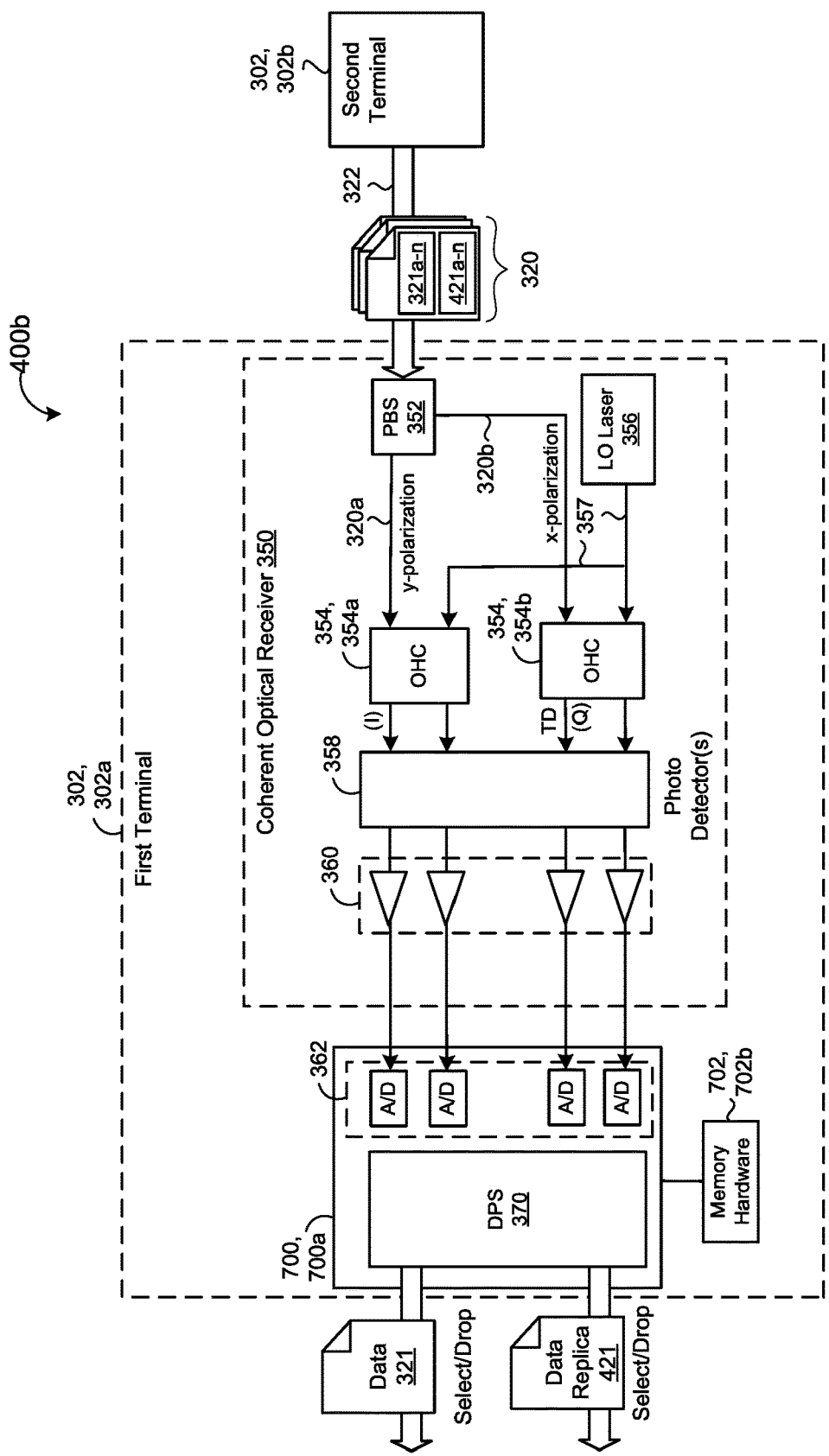
FIG. 4B is a schematic view of an example communication terminal including a coherent optical receiver configured to receive replicas of data on two polarization portions of an optical signal.

The first terminal 302a includes a coherent optical receiver 350 configured to receive the optical signal 320 transmitted from transmitter optics 306 of the second terminal 302b through the optical link 322. In some examples, the first terminal 302a and the second terminal 302b include substantially similar components that permit the terminals 302 to transmit and receive optical signals 320 through the free space optical link 322. Each terminal 302a, 302b includes the control hardware 700, 700a-b and memory hardware 702, 702a-b (FIGS. 4A and 4B). The memory hardware 702 stores information, such as instructions executable by the control hardware 700, non-transitorily at the control hardware 700. The memory hardware 702 may be a computer-readable medium, a volatile memory unit(s), or non-volatile memory unit(s). The memory hardware 702 may be physical devices used to store programs (e.g., sequences of instructions) or data (e.g., program state information) on a temporary or permanent basis for use by the control hardware 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes. The control hardware 700 can be, for example, a processor executing computer-readable instructions stored in the memory hardware 702, a field programmable gate array (FGPA), a digital signal processor (DSP), or any other suitable circuitry.

In some implementations, optical power fading of the optical signal 320 communicated between the terminals 302 via the optical link 322 increases when turbulence of the air 325 over the optical link 322 increases. For instance, optical power fading resulting from turbulent air 325 may cause a received optical power 330 of the optical signal 320 at the first terminal 302 to decrease from a transmission power 310 of the optical signal 320 at the transmitting second terminal 302b. In some examples, deep optical power fades cause a drastic decrease in the received optical power 330 from the transmission power 310 that results in a loss of the optical link 322. A loss of the optical link 322 causes the receiving first terminal 302a failing to receive some or all of the data 321 within the optical link 322.

Turbulence of the air 325 may increase with longer separation distances between the terminals 302a, 302b, changes in density of the air 325, changes in wind speeds, changes in air pressure, and/or directionality of the optical link 322. Accordingly, optical power fading associated with turbulent air 325 dynamically effects the communication of optical signals 320 between the terminals 302 via the optical link 322. Diversity schemes can be employed to mitigate optical power fading by transmitting replicas 421 of the data 321 so that one of the data 321 or the corresponding data replica 421 will propagate through a less turbulent medium, and thus, avoid a power fade over the optical link 322. While spatial diversity schemes transmit the data 321 and data replicas 421 over two separate wavelengths each from different locations, the requirement of an additional transmitter adds to additional space, weight, and power requirements. Conversely, as time/wavelength diversity schemes only necessitate one physical location to transmit two optical wavelengths each carrying the same data 321 delayed in time, time/wavelength diversity schemes use twice as much transmission power 310 to achieve the same capacity as a single optical channel. Some time/wavelength diversity schemes use a single optical wavelength with a fixed time delay separating the data 321 and corresponding data replicas 421; however, the fixed time delay produces a fixed latency over the optical link 322, thereby limiting the ability to optimize latency relative to the level of turbulence of the air 325 over the optical link 322, which can fluctuate depending upon weather conditions, altitude, and directionality associated with the optical link 322.

The transmitter optics 306 at the second terminal 302b transmit the optical signal 320 and the coherent optical receiver 350 at the first terminal 302a receives the optical signal 320 to establish the optical link 322. In some implementations, the second terminal 302b transmits the optical signal 320 in a single optical wavelength that includes the data 321 on a first portion 320a of the optical signal 320 and replicas 421 of the data 321 on a second portion 320b of the optical signal 320. In some examples, the optical signal 320 includes a polarization multiplexed optical carrier that combines the first portion 320a associated with a first polarization and the second portion 320b associated with a second polarization different from the first polarization. The polarizations of the first portion 320a and the second portion 320b may be orthogonal to one another such that the data 321 and the data replicas 421 do not interfere with each other during transmission over the optical link 322. Accordingly, the first portion 320a may refer to a y-polarization portion of the optical signal 320 containing data 321 and the second portion 320b may refer to an x-polarization portion of the optical signal 320 containing data replicas 421. The examples hereinafter may refer to the first portion 320a as the x-polarization portion and the second portion 320b as the y-polarization portion; however, other examples can include the first portion 320a having the x-polarization and the second portion 320b having the y-polarization.

In some implementations, the x-polarization portion 320b of the optical signal 320 is delayed in time relative to the y-polarization portion 320b of the optical signal 320. For example, the y-polarization portion 320a carrying the data 321 may be associated with an in-phase signal, while the x-polarization portion 320b carrying the data replica 421 may be associated with a quadrature signal that delays a transmission time of the data replica 421 on the x-polarization portion 320b relative to the transmission time of the data 321 on the y-polarization portion 320a. By using two polarizations to carry replicas of the same data 321, 421 delayed in time, optical power fades may only impact the data 321, 421 on one of the polarization portions 320a, 320b of the optical signal 320 while the data 321, 421 on the other one of the polarization portions 320a, 320b is able to successfully propagate through the optical link 322, and thus avoid the optical power fade.

Thus, the optical signal 320 including the data 321 and the data replica 421 on respective ones of the y-polarization portion 320a and the x-polarization portion 320b, but delayed in time relative to one another, effectively mitigates optical power fading caused by turbulent air 325 without requiring redundant physical hardware to send the same data 321, 421 from two different physical locations or without incurring increases in transmit optical power requirements for transmitting two optical signals each containing the same data 321, 421. In some implementations, the second terminal 302b variably adjusts the time delay between the y-polarization and x-polarization portions 320a, 320b relative to a level of turbulence of the air 325 to optimize latency over the optical link 322. For instance, the turbulence of the air 325 varies depending upon weather conditions, altitude, and directionality of the optical link 322 between the terminals 302a, 302b. In some examples, when turbulence is low or otherwise not causing optical power fading over the optical link 322, the second terminal 302b provides no time delay between the y-polarization and x-polarization portions 320a, 320b, thereby effectively doubling the capacity of the optical signal 320.

FIG. 3 shows the coherent optical receiver 350 of the first terminal 302a receiving the data 321 on the y-polarization portion 320a of the optical signal 320 during a first time period t, and receiving the data replica 421 on the x-polarization portion 320b of the optical signal 320 during a second time period t+1 delayed in time relative to the first time period t. That is to say, the time delay of the received data replica 421 on the x-polarization portion 320b results from the x-polarization portion 320b being delayed in time relative to the y-polarization portion 320a when the second terminal 302b transmits the optical signal 320. In some examples, the control hardware 700a uses signal digital processing to decode the received data 321 and received data replicas 421 for determining Bit Error Rates (BERs) of the data 321 and corresponding data replica 421 on a frame-by-frame (e.g., packet-by-packet) basis. For instance, the control hardware 700a may determine the data 321 received on the y-polarization portion 320a is associated with a BER equal to zero and the data replica 421 received on the x-polarization portion 320b is associated with a BER equal to 50. Thereafter, the control hardware 700a compares the BERs and selects the one of the data 321 or the data replica 421 that is associated with the polarization portion 320a, 320b exhibiting the lowest BER as surviving data for the maintaining the optical link 322. In the example, the control hardware 700a selects the data 321 received on the y-polarization portion 320a that exhibits the BER equal to zero as the surviving data and drops the data replica 421 received on the x-polarization polarization 320b that exhibits the higher BER equal to 50.

Accordingly, the higher BER associated data replica 421 received on the x-polarization portion 320b correlates to a decrease in the receiving power for the optical link 322 during the second time period t+1 resulting from a power fade of the optical link 322. To put another way, the optical power fade causes the received optical power 330 of the optical signal 320 received during the second time period t+1 to decrease from the received optical power 330 during the first time period t. Thus, the control hardware 700a employed by the first terminal 302a mitigates the power fade impacting data replica 421 received on the x-polarization portion 320b during the second time period t+1 by dropping the data replica 421 and selecting the data 321 received on the y-polarization portion 320a during the first time period t as the surviving data for maintaining the optical link 322.

FIG. 4A is a schematic view 400a of the second terminal 302b including the transmitter optics 306 configured to transmit a single optical single 320 containing data 321 and replicas 421 of the data 321 on two polarization portions 320a, 320b delayed in time relative to one another. The second terminal 302b includes a transmitter module 500, an optical divider 304, two modulators 308, 308a-b, a polarization rotator 314, the transmitter optics 306, the control hardware 700b, and the memory hardware memory hardware 702b.

Figure 5:
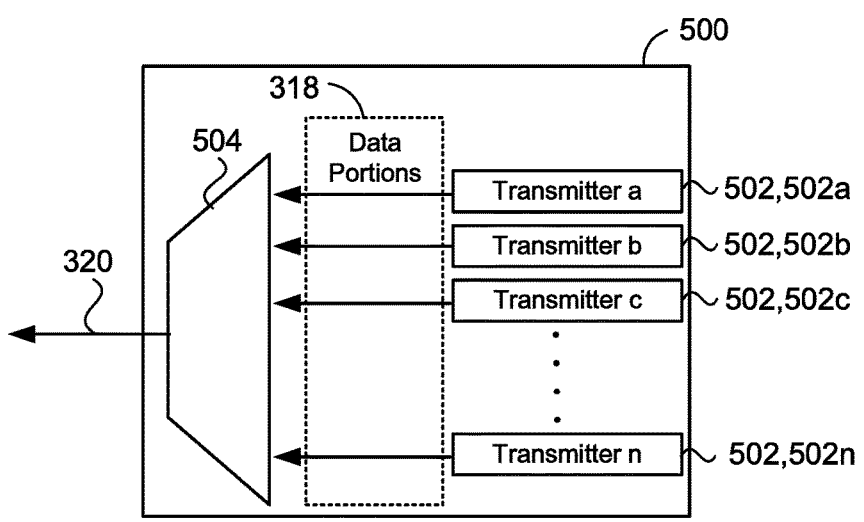
FIG. 5 is a schematic view of an example transmitter module including a wavelength division multiplexer.

The transmitter module 500 may provide the optical signal 320 to the optical divider 308 to divide the optical signal 320 into to two portions each including the same data 321 for input to respective ones of the first modulator 308a and the second modulator 308b. The data 321 includes a stream of one or more data packets 321a-n input to each of the modulators 308. Referring to FIG. 5, in some implementations, the transmitter module 500 includes one or more transmitters 502, 502a-n each transmitting portions 318 of the data 321 to a wavelength division multiplexer 504 (hereinafter 'WDM 504'). In some examples, the transmitters 502 include optical transmitters that transmit optical signals including associated data portions 318. The WDM 504 may multiplex the data portions 318 to propagate the optical signal 320 with the data 321. In some examples, the WDM 504 provides the optical signal 320 with a dedicated channel for transmission of the optical signal 320 in a single wavelength over the optical link 322.

Referring back to FIG. 4A, the modulators 308 may adjust an amplitude or gain to the divided portions of the optical signal 320 for achieving a minimum transmission power 310 required for transmitting the optical signal 320 to the first terminal 302a through the optical link 322. In some implementations, the control hardware 700b is in communication with the memory hardware 702b and includes a field-programmable gate array (FPGA) configured to provide phase inputs 312, 312a-b to the modulators 308a, 308b for adjusting a phase (e.g., time delay) of each of the y- and x-polarization portions 320a, 320b combined into the optical signal 320 by the transmitter optics 306. For instance, the phase inputs 312 may direct the modulators 308 to delay one of the y-polarization portion 320a or the x-polarization portion 320b relative to the other one of the y-polarization portion 320a or the x-polarization portion 320b based upon turbulence levels of the air 325 to mitigate optical power fades over the optical link 322. In some examples, the control hardware 700b employing the FPGA provides a first phase input 312a to the first modulator 308a to encode each of the data packets 321 on an in-phase signal (I) and provide a second phase input 312b to the second modulator 308b to encode each of the data packets 321 on a quadrature signal (Q) that is delayed in time relative the in-phase signal. Accordingly, the second modulator 308b outputs replicas 421 of the data packets 321 having a time delay (TD) relative to the data packets 321 output from the first modulator 308a and are associated with a first polarization (e.g., x-polarization).

The associated with the in-phase signal (I) initially include the first polarization (e.g., x-polarization) when the first modulator 308a provides the data packets 321 to the polarization rotator 314. The polarization rotator 314 is operative to rotate the polarization of the in-phase signal (I) by a desired angle. In some examples, the polarization rotator 314 rotates the polarization by 90 degrees such that the data packets 321 output from the polarization rotator 314 include a second polarization (e.g., y-polarization) orthogonal to the first polarization (e.g., x-polarization) of the data packet replicas 421. Accordingly, the y-polarization portion 320a including the data packets 321 encoded on the in-phase signal (I) and the x-polarization portion 320b including the data packet replicas 421 encoded on the time-delayed (TD) quadrature signal (Q) are input to the transmitter optics 306. The transmitter optics 306 include an optical combiner to combine the y-polarization portion 320a and the x-polarization portion 320b into the single wavelength optical signal 320 for transmission to the first terminal 302a through the free-space optical link 322. The optical signal 320 includes one or more data packet replicas 421a-n on the x-polarization portion 320b each delayed in time relative to corresponding ones of the one or more data packets 321a-n on the y-polarization portion 320a.

FIG. 4B is a schematic view 400b of the first terminal 302b receiving the single optical single 320 containing the one or more data packets 321a-n and the one or more data packet replicas 421a-n on respective ones of the two polarization portions 320a, 320b from the second terminal 302b of FIG. 4B. The first terminal 302a includes the coherent optical receiver 350, the control hardware 700a and the memory hardware 702a. The coherent optical receiver 350 may include, but is not limited to, a polarization beam splitter PBS 352, two optical hybrid circuits (OHCs) 354, 354a-b, a local oscillator (LO) laser 356, one or more photo detectors 358, and trans impedance amplifiers 360.

The coherent optical receiver 350 of the first terminal 302a receives the single wavelength optical signal 320 from the second terminal 302b through the optical link 322. The optical signal 320 includes the y-polarization portion 320a containing the one or more data packets 321a-n and the x-polarization portion 320b delayed in time relative to the y-polarization portion and containing the one or more data packet replicas 421a-n. The optical signal 320 passes through the PBS 352 to divide the optical signal 320 into the y-polarization portion 320a for input to the first OHC 354a and the x-polarization portion 320b for input to the second OHC 354b. In some examples, the OHCs 354 each include a 90 degree OHC having a two by two optical coupler with one arm of the couplers implementing a 90 degree phase delay function for extracting the in-phase signal (I) and the time-delayed (TD) quadrature signal (Q) of the optical signal 320 using interference 357 from the LO laser 356. The OHCs 354 provide the respective phase signals (I), (Q) to the one or more photo detectors 358 for conversion from the optical domain into the electronic domain. In some examples, the coherent optical receiver 350 includes a series of balanced photo detectors 358 enabling the LO laser 356 to use less power for transmitting the interference signals 357 to the OHCs 354. In other examples, the coherent optical receiver 350 includes a single photo detector 358. Conversely to using the series of balanced photo detectors that require less power from the LO laser 356, the single photo detector 358 requires the LO laser 356 to use more power (e.g., 20-25 dB more power) than the received optical power 330 of the optical signal 320 in order for the coherent optical signal 320 to dominate. Moreover, the coherent optical receiver 350 only requires that the frequency of the interference signals 357 transmitted by the LO laser 356 only be within 1 GHz of the incoming optical signal, and thus, adjustments to the phase and frequency of the LO laser 357 can be relative slow.

After the one or more photo detectors 358 convert the y-polarization and x-polarization portions 320a, 320b of the optical signal 320 from the optical domain to the digital domain, the portions 320a, 320b and the interference signals 357 pass through the trans impedance amplifiers 360 and are received by the control hardware 700a. The control hardware 700a may include analog-to-digital converters 362.

In some examples, the control hardware 700a includes a digital signal processor (DSP) 370 to interpret each data packet 321 received on the y-polarization portion 320a of the optical signal 320 and to interpret each data packet replica 421 received on the x-polarization portion 320b of the optical signal 320. More specifically, the DSP 370 may encode each data packet 321 received on the y-polarization portion 320a to determine a BER of the data packet 321 and use the BER to determine the receiving power for the optical link 322 during a respective time period at which the data packet 321 is received at the first terminal 302a. For instance, data packets 321 associated with high BERs correlate to decreases in the receiving power for the optical link 322 caused by optical power fades. Deep optical power fades may severely corrupt a data packet 321 communicated through the optical link 322 and result in a loss of the optical link 322. Likewise, the DSP 370 may encode each data packet replica 421 received on the x-polarization portion 320b to determine a BER of the data packet replica 421 and use the BER to determine the receiving power for the optical link 322 during the respective time period at which the data packet replica 421 is received at the first terminal 302a. In some examples, the DSP 370 compares the BER for each data packet 321 with the BER for the corresponding data packet replica 421 to determine that the data packet 321 or the data packet replica 421 with the lowest BER is associated with the highest receiving power for the optical link.

As the one or more data packet replicas 421 received on the x-polarization portion 320b are delayed in time relative to the one or more corresponding data packets 321 received on the y-polarization portion, the DSP 370 may use the BER of the data packet 321 received on the y-polarization portion 320a to determine the receiving power for the optical link 322 during a first time period, and use the BER of the data packet replica 421 received on the x-polarization 320b to determine the receiving power for the optical link 322 during a second time period delayed in time relative to the first time period. In some implementations, the DSP 370 selects one of the data packet 321 or the corresponding data packet replica 421 that is associated with the highest receiving power for maintaining the optical link 322. Fluctuations in turbulent air 325 may cause power fading over the optical link 322 to only impact/corrupt one of the data packet 321 or the data packet replica 421 while the other one of the data packet 321 or the data packet replica 421 received earlier or later in time avoids the power fade and successfully propagates through the optical link 322. Thus, the impacts of optical power fading can be mitigated by using polarization diversity in the optical coherent receiver 350 to receive the same data (e.g., the data packet 321 and the data packet replica 421) on two orthogonal polarization portions 320a, 320b that are delayed in time relative to each other.

Figure 6:
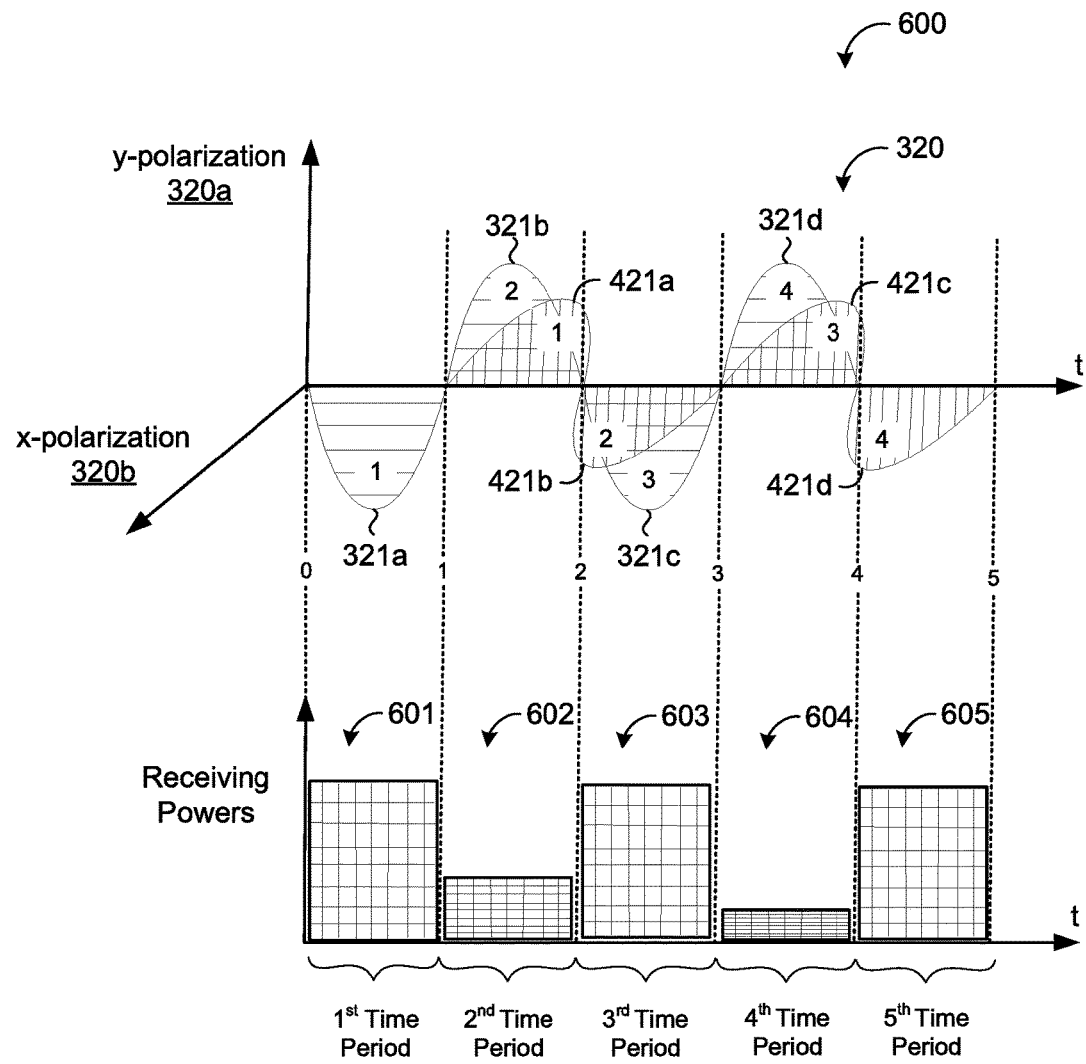
FIG. 6 shows a dual plot of a dual polarization optical signal received by a communication terminal and receiving powers for the optical link as a function of time.

FIG. 6 shows a dual plot 600 of the dual polarization optical signal 320 received by the first terminal 302a of FIGS. 3, 4A, and 4B and receiving powers 601-605 for the optical link 322 as a function of time (t). The optical signal 320 includes the x-polarization portion 320a carrying data packets 321a-d and the y-polarization portion 320b carrying replicas 421a-d of the data packets 321a-d each delayed in time relative to corresponding ones of the data packets 321a-d. Each receiving power 601-605 is associated with a receiving power for the optical link 322 during a respective one of successive time periods and may be based on the BERs of the data packets 321a-d and the data packet replicas 421a-d associated with each respective time period. For example, the control hardware 700a may encode each data packet 321a-d and each data packet replica 421a-d received during each successive time period to determine the BERs, and use the BERs to determine the receiving powers 601-605 for the optical link 322 during each successive time period. For instance, the BER for a given data packet 321 or replica 421 is inversely proportional to the receiving power for the optical link 322 during the time period at which the data packet 321 or replica 421 was received.

In some examples, the first terminal 302a receives a first data packet 321a on the y-polarization portion 320a during a first time period between times 0 and 1, and after a period of time delay, the first terminal 302a receives a first data packet replica 421a on the x-polarization portion 320b during a second time period between times 1 and 2. The control hardware 700a of the first terminal 302a encodes the first data packet 321a to determine the receiving power 601 for the optical link 322 during the first time period and encodes the second data packet 321b to determine the receiving power 602 for the optical link 322 during the second time period. The control hardware 700 compares the receiving powers 601, 602 and selects the one of the first data packet 321a or the first data packet replica 321b that is associated with the highest one of the receiving powers 601, 602 for the optical link 322 as surviving data for maintaining the optical link 322. The example shows a greater receiving power 601 during the first time period than the receiving power 602 during the second time period, and therefore, the control hardware 700a selects the first data packet 321a received on the y-polarization portion 320a as the surviving data for maintaining the optical link 322 and drops the first data packet replica 421a received on the x-polarization portion 320b. The circle in plot 600 denotes the selection of the first data packet 321a received on the y-polarization portion 320a over the first data packet replica 421a received on the x-polarization portion 320b.

In some examples, when the first terminal 302a receives the first data packet replica 421a on the x-polarization portion 320b during the second time period, the first terminal 302a also receives a second data packet 321b on the y-polarization portion 320a. In some scenarios, the control hardware 700 determines the receiving power 602 during the second time period based on the BER of at least one of the first data packet replica 421a or the second data packet 321b. Accordingly, the control hardware 700 may encode the second data packet 321b received on the y-polarization portion 320a to determine the receiving power 602. After a period of time delay, the first terminal 302a receives a second data packet replica 421b on the x-polarization portion 320b during a third time period between times 2 and 3. Upon receiving the second data packet replica 421b, the control hardware 700a encodes the second data packet replica 421b to determine the receiving power 603 for the optical link 322 during the third time period. The control hardware 700 compares the receiving powers 602, 603 and selects the one of the second data packet 321b or the second data packet replica 421b that is associated with the highest one of the receiving powers 602, 603 for the optical link 322 as surviving data for maintaining the optical link 322. The example shows a greater receiving power 603 during the third time period than the receiving power 602 during the second time period, and therefore, the control hardware 700a selects the second data packet replica 421b received on the x-polarization portion 320b as the surviving data for maintaining the optical link 322 and drops the second data packet 321b received on the y-polarization portion 320a. The circle in plot 600 denotes the selection of the second data packet replica 421b received on the x-polarization portion 320b over the second data packet 321b received on the y-polarization portion 320a.

In some examples, when the first terminal 302a receives the second data packet replica 421b on the x-polarization portion 320b during the third time period, the first terminal 302a also receives a third data packet 321c on the y-polarization portion 320a. In some scenarios, the control hardware 700 determines the receiving power 603 during the third time period based on the BER of at least one of the second data packet replica 421b or the third data packet 321c. Accordingly, the control hardware 700 may encode the third data packet 321c received on the y-polarization portion 320a to determine the receiving power 603. After a period of time delay, the first terminal 302a receives a third data packet replica 421c on the x-polarization portion 320b during a fourth time period between times 3 and 4. Upon receiving the third data packet replica 421c, the control hardware 700a encodes the third data packet replica 421c to determine the receiving power 604 for the optical link 322 during the fourth time period. The control hardware 700 compares the receiving powers 603, 604 and selects the one of the third data packet 321c or the third data packet replica 421c that is associated with the highest one of the receiving powers 603, 604 for the optical link 322 as surviving data for maintaining the optical link 322. The example shows a greater receiving power 603 during the third time period than the receiving power 604 during the fourth time period, and therefore, the control hardware 700a selects the third data packet 321c received on the y-polarization portion 320a as the surviving data for maintaining the optical link 322 and drops the third data packet replica 421c received on the x-polarization portion 320b. The circle in plot 600 denotes the selection of the third data packet 321c received on the y-polarization portion 320a over the third data packet replica 421c received on the x-polarization portion 320b.

Moreover, when the first terminal 302a receives the third data packet replica 421c on the x-polarization portion 320b during the fourth time period, the first terminal 302a may also receive a fourth data packet 321d on the y-polarization portion 320a. Here, the control hardware 700 may determine the receiving power 604 during the fourth time period based on the BER of at least one of the third data packet replica 421c or the fourth data packet 321d. Accordingly, the control hardware 700 may encode the fourth data packet 321d received on the y-polarization portion 320a to determine the receiving power 604. After a period of time delay, the first terminal 302a receives a fourth data packet replica 421d on the x-polarization portion 320b during a fifth time period between times 4 and 5. Upon receiving the fourth data packet replica 421d, the control hardware 700a encodes the fourth data packet replica 421d to determine the receiving power 605 for the optical link 322 during the fifth time period. The control hardware 700 compares the receiving powers 604, 605 and selects the one of the fourth data packet 321d or the fourth data packet replica 421d that is associated with the highest one of the receiving powers 604, 605 for the optical link 322 as surviving data for maintaining the optical link 322. The example shows a greater receiving power 605 during the fifth time period than the receiving power 604 during the fourth time period, and therefore, the control hardware 700a selects the fourth data packet replica 421d received on the x-polarization portion 320b as the surviving data for maintaining the optical link 322 and drops the fourth data packet 321d received on the y-polarization portion 320a. The circle in plot 600 denotes the selection of the fourth data packet replica 421d received on the x-polarization portion 320b over the fourth data packet 321d received on the y-polarization portion 320a.

Figure 7:
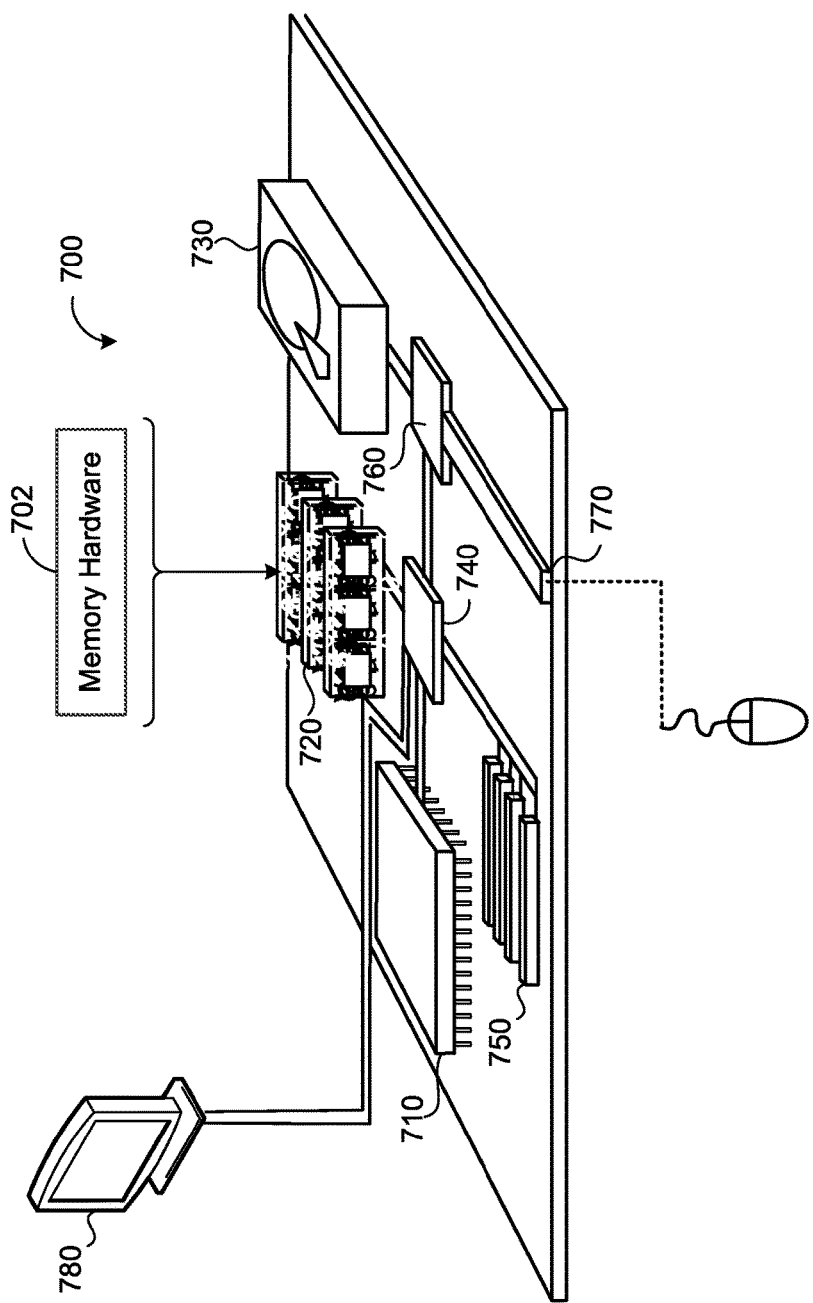
FIG. 7 is a schematic view of example control hardware of a communication terminal.

FIG. 7 is a schematic view of an example of the control hardware 700 that may be used to implement the systems and methods described in this document. The control hardware 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The control hardware 700 includes a processor 710, memory 720, a storage device 730, a high-speed interface/controller 740 connecting to the memory 720 and high-speed expansion ports 750, and a low speed interface/controller 760 connecting to a low speed bus 770 and storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a GUI on an external input/output device, such as a display 780 coupled to a high speed interface 740. In other implementations, multiple processors and/or multiple buses may be used, as appropriate, along with multiple memories and types of memory. Also, multiple control hardware devices 700 may be connected, with each device providing portions of the necessary operations (e.g., as a server bank, a group of blade servers, or a multi-processor system).

The memory 720 includes hardware that stores information non-transitorily within the control hardware 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the control hardware 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), phase change memory (PCM).

The storage device 730 is capable of providing mass storage for the control hardware 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 830 and low-speed expansion port 770. The low-speed expansion port 770, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The control hardware 700 may be implemented in a number of different forms, as shown in the figure. For example, it may be implemented as a standard server 700a or multiple times in a group of such servers 700a, as a laptop computer 700b, or as part of a rack server system 700c.

In some implementations, the control hardware 700 is in communication with memory hardware 702 (e.g., in the memory 720). The control hardware 700 at the first communication terminal 302a may receive the first data packet 321a on a y-polarization portion 320a of the optical signal 320 from the second communication terminal 302b through the optical link 322 during the first time period. The control hardware 700 may also receive the first data packet replica 421a on the x-polarization portion 320b during the second time period. The second time period is delayed in time relative to the first time period. In some examples, the control hardware 700 determines receiving powers 601, 602 for the optical link 322 during both the first time period and the second time period based on at least one of the received first data packet 321a and the first data packet replica 421a. Thereafter, the control hardware 700 may select the one of the first data packet 321a or the first data packet replica 421a that is associated with the highest receiving power for the optical link as surviving data for maintaining the optical link 322.

A software application (i.e., a software resource 110s) may refer to computer software that causes a computing device to perform a task. In some examples, a software application may be referred to as an "application," an "app," or a "program." Example applications include, but are not limited to, mobile applications, system diagnostic applications, system management applications, system maintenance applications, word processing applications, spreadsheet applications, messaging applications, media streaming applications, social networking applications, and gaming applications.

The memory hardware 110hm may be physical devices used to store programs (e.g., sequences of instructions) or data (e.g., program state information) on a temporary or permanent basis for use by a computing device 110hc. The non-transitory memory 110hm may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
applying, at a first communication terminal, a time delay between a first polarization portion of an optical signal and a second polarization portion of the optical signal to delay the second polarization in time relative to the first polarization;
combining, at the first communication terminal, the first polarization portion carrying a first data packet and the second polarization portion carrying a replica of the first data packet in the optical signal, the first polarization portion having a different polarization than the second polarization portion; and,
transmitting, using transmitter optics at the first communication terminal, the optical signal to a second communication terminal using the time delay between transmitting the first data packet and transmitting the replica of the first data packet,
wherein applying the time delay includes determining the time delay between the second polarization portion and the first polarization portion based on environmental conditions at the first communication terminal.

2. The method of claim 1, wherein the first polarization portion and the second polarization portion are orthogonal to one another.

3. The method of claim 1, wherein the first communication terminal transmits the optical signal in a single optical wavelength.

4. The method of claim 1, further comprising encoding, at the first communication terminal, the first polarization portion and the second polarization portion onto a polarization multiplexed optical carrier comprising the optical signal for transmission to the second communication terminal.

5. The method of claim 1, wherein the conditions at the first communication terminal include at least one of weather conditions, altitude, or directionality of an optical link with the second communication terminal.

6. The method of claim 1, further comprising:
determining, at the first communication terminal, that the time delay is not needed; and
transmitting, using the transmitter optics at the first communication terminal, the optical signal without the time delay between the first polarization portion and the second polarization portion.

7. The method of claim 6, wherein determining that the time delay is not needed is based on at least one of weather conditions, altitude, or directionality of an optical link with the second communication terminal.

8. The method of claim 1, wherein the first communication terminal or the second communication terminal comprises a high-altitude platform.

9. A first communication terminal comprising:
transmitter optics;
control hardware in communication with the transmitter optics; and
memory hardware in communication with the control hardware, the memory hardware storing instructions that when executed on the control hardware cause the control hardware to perform operations comprising:
applying a time delay between a first polarization portion and a second polarization portion to delay the second polarization in time relative to the first polarization;
combining the first polarization portion carrying a first data packet and the second polarization portion carrying a replica of the first data packet in an optical signal, the first polarization portion having a different polarization than the second polarization portion; and
transmitting, using transmitter optics, the optical signal to a second communication terminal using the time delay between transmitting the first data packet and transmitting the replica of the first data packet,
wherein applying the time delay includes dynamically adjusting the time delay between the second polarization portion and the first polarization portion based on environmental conditions at the first communication terminal.

10. The first communication terminal of claim 9, wherein the first polarization portion and the second polarization portion are orthogonal to one another.

11. The first communication terminal of claim 9, wherein the optical signal is transmitted in a single optical wavelength.

12. The first communication terminal of claim 9, further comprising a polarization multiplexed optical carrier, and wherein the operations further comprise encoding the first polarization portion and the second polarization portion onto the polarization multiplexed optical carrier comprising the optical signal for transmission to the second communication terminal through an optical link.

13. The first communication terminal of claim 9, wherein the conditions include at least one of weather conditions, altitude, or directionality of an optical link with the second communication terminal.

14. The first communication terminal of claim 9, wherein the operations further comprise:
determining that the time delay is not needed; and
transmitting, using the transmitter optics, the optical signal without the time delay between the first polarization portion and the second polarization portion.

15. The first communication terminal of claim 14, wherein determining that the time delay is not needed is based on at least one of weather conditions, altitude, or directionality of an optical link with the second communication terminal.

16. The first communication terminal of claim 9, wherein the first communication terminal comprises a high-altitude platform.

17. A non-transitory, tangible computer-readable storage medium on which computer readable instructions of a program are stored, the instructions, when executed by one or more processors, cause the one or more processors to perform a method, the method comprising:
applying, at a first communication terminal, a time delay between a first polarization portion and a second polarization portion to delay the second polarization in time relative to the first polarization;
combining, at the first communication terminal, the first polarization portion carrying a first data packet and the second polarization portion carrying a replica of the first data packet in an optical signal, the first polarization portion having a different polarization than the second polarization portion; and
transmitting, using transmitter optics at the first communication terminal, the optical signal to a second communication terminal using the time delay between transmitting the first data packet and transmitting the replica of the first data packet,
wherein applying the time delay includes determining the time delay between the second polarization portion and the first polarization portion based on environmental conditions at the first communication terminal.

18. The non-transitory, tangible computer-readable storage medium of claim 17, wherein applying the time delay includes determining the time delay between the second polarization portion and the first polarization portion based on at least one of weather conditions, altitude, or directionality of an optical link with the second communication terminal.

* * * * *